United States Patent
Fifis et al.

(10) Patent No.: US 8,908,902 B2
(45) Date of Patent: Dec. 9, 2014

(54) DEVICE FOR VERIFYING THE INTEGRITY OF AN ITEM OF DISPLAYED DATA AND ASSOCIATED METHOD

(75) Inventors: Jacques Fifis, Saint Genis Laval (FR); Christian Louis Georges Henri Euvrard, Chassieu (FR)

(73) Assignee: ALSTOM Transport SA, Levallois-Perret (FR)

( * ) Notice: Subject to any disclaimer, the term of this patent is extended or adjusted under 35 U.S.C. 154(b) by 727 days.

(21) Appl. No.: 12/839,952

(22) Filed: Jul. 20, 2010

(65) Prior Publication Data

US 2011/0063452 A1 Mar. 17, 2011

(30) Foreign Application Priority Data

Jul. 21, 2009 (FR) ...................................... 09 55071

(51) Int. Cl.
*G06K 9/00* (2006.01)
*H04N 17/00* (2006.01)
*G01R 31/00* (2006.01)
*G01R 31/319* (2006.01)
*G06F 3/14* (2006.01)

(52) U.S. Cl.
CPC .............. *G06F 3/14* (2013.01); *G09G 2370/04* (2013.01)
USPC ........... 382/100; 382/104; 382/181; 382/209; 382/218; 702/85; 702/96; 702/108; 725/19

(58) Field of Classification Search
CPC ............ H04N 1/0005; H04N 1/00002; H04N 1/00029; H04N 1/00042; H04N 1/00063; H04N 1/00068; H04N 17/00; G06K 9/00496; G06K 9/00838; G06K 9/03; G01R 31/2846
USPC ............ 382/100, 104, 181, 209, 218; 702/85, 702/96, 108; 725/19
See application file for complete search history.

(56) References Cited

U.S. PATENT DOCUMENTS

| | | | | |
|---|---|---|---|---|
| 3,868,843 | A * | 3/1975 | Moseman, Jr. | 73/1.88 |
| 6,693,558 | B2 * | 2/2004 | Hedrick | 340/971 |
| 7,012,553 | B2 * | 3/2006 | Hedrick | 340/971 |
| 7,714,740 | B2 * | 5/2010 | Lipman | 340/688 |
| 8,294,772 | B2 * | 10/2012 | Duvanenko et al. | 348/192 |
| 2005/0276514 | A1 | 12/2005 | Fisher | |
| 2007/0046670 | A1 * | 3/2007 | Hedrick et al. | 345/440 |
| 2008/0100611 | A1 * | 5/2008 | Block et al. | 345/418 |

FOREIGN PATENT DOCUMENTS

| | | | |
|---|---|---|---|
| DE | 10 2005 045601 A1 | 4/2007 |
| FR | 2 788 365 A1 | 7/2000 |
| FR | 2 792 429 A1 | 10/2000 |
| FR | 2 868 193 A1 | 9/2005 |

* cited by examiner

OTHER PUBLICATIONS

Eldredge, et al. United States. NTIS/FAA/DOT. Digital System Bus Integrity. 1987. Print.*

*Primary Examiner* — Michael A Newman
(74) *Attorney, Agent, or Firm* — Davidson, Davidson & Kappel, LLC

(57) ABSTRACT

A device for verifying the integrity of an item of data displayed on a display device controlled by a video controller, the video controller being connected to the display device by an appropriate connection and transmitting to it a video signal including an input interface which allows the device to be connected at a branch of the connection between the video controller and the display device, a reconstruction device which is capable, from the derived video signal, of reconstructing an image corresponding to the image displayed on the display device; an analysis device which is capable of extracting an item of reconstructed data from the reconstructed image, a comparison device which is capable of comparing the reconstructed data with a reference value of the item of data to be displayed and an alarm means which is capable of activating a malfunction alarm in accordance with the result at the output of the comparison device.

13 Claims, 2 Drawing Sheets

DEVICE FOR VERIFYING THE INTEGRITY OF AN ITEM OF DISPLAYED DATA AND ASSOCIATED METHOD

This claims the benefit of French Patent Application No. 09 55071, filed on Jul. 21, 2009 and hereby incorporated by reference herein.

The invention relates to devices for verifying the integrity of an item of data displayed, as an image, on a display device.

BACKGROUND

In railway vehicles, various items of information are displayed in the cabin in order to be monitored by the driver.

From the various items of displayed data, some are more particularly sensitive since they lead to control actions on the part of the driver.

This is the case, for example, for displaying the instantaneous speed of the vehicle.

The driver regularly takes this displayed information into account to correct the speed of the vehicle in order to comply with the speed limits imposed along the railway track.

It is therefore imperative to provide a reliable display for these sensitive items of data.

Generally, display devices located in the cabin show the information in the form of an image displayed on a screen. In this instance, the display device is controlled by a video controller. The video controller receives, from a main controller, a series of graphic orders which correspond to the image to be displayed; the video controller processes this series of graphic orders to generate a "bit-map" or "a matrix of pixels", which is a point by point representation of the image to be displayed; it stores this bit-map in a dedicated video memory; and it encodes this bit-map in an appropriate manner in order to transmit it to the display device in order to actually display the image on the screen.

Document FR 2 868 193 discloses a display architecture which comprises a means which is for verifying the integrity of the displaying and which is capable of reading the content of the video memory of the video controller and comparing the content read with a reference value.

According to this architecture, the verification allows potential malfunctions to be detected upstream of the video memory of the video controller.

However, a number of risks of error may affect the video controller itself, in particular its manner of encoding the bit-map in order to transmit it to the display device, and the integrity of the connection between the output interface of the video controller and the input interface of the display device. It should be noted that, in some arrangements, the video controller and the display device may be spaced-apart from each other, for example, by 10 meters or more.

Furthermore, video controller manufacturers do not willingly describe the internal architecture of their hardware and how to access the contents of the memory.

Document WO 2007/033902 describes a display architecture in which, for each value of information to be displayed, a specific pictogram is introduced into a specific zone of the image to be displayed. By analyzing this particular zone of the image, it is possible to detect the pictogram and derive from it the value of information which it encodes. Comparing this derived value with the reference value allows any inconsistencies to be detected which may be symptomatic of a malfunction in the displaying chain. However, in addition to the fact that this technique overloads the image, it has the significant disadvantage of only verifying with certainty the zone where the additional pictogram is displayed, without truly verifying the zone where the information used is displayed.

Document FR 2788365 describes a liquid crystal display device comprising a plurality of elements which are independently controlled, of the "7-segments" type. It also comprises means for rereading the state of each element, which allows the verification that each element is really in the state corresponding to the control instruction applied to it. Of course, this technique cannot be transposed to displays of pixel matrixes of great size since it would require control circuits for each pixel, which would make the overall device too complex and costly.

SUMMARY OF THE INVENTION

An object of the invention is therefore to overcome the above-mentioned problems, by providing a device which allows the integrity of the image to be displayed to be verified over the entire displaying chain, while allowing the use of "ready-to-use" components, as provided by the manufacturers.

The present invention therefore provides a device for verifying the integrity of an item of data displayed in a zone of an image displayed on a display device controlled by a video controller, the video controller being connected to the display device by means of an appropriate connection and transmitting to it a video signal in a predetermined format, and comprising an input interface which allows the verification device to be connected at a branch of the connection between the video controller and the display device; characterized in that it comprises: a reconstruction means which is capable, from the video signal applied to the input interface of the device, of reconstructing an image corresponding to the zone of the image displayed on the display device; an analysis means which is capable of extracting a reconstructed item of data from the reconstructed image; and a comparison means which is capable of comparing the reconstructed item of data with a reference value of the item of data to be displayed.

That is to say, the invention provides reconstructing in a dedicated system the portion of the image which includes the information corresponding to the item of data displayed, and deriving from this reconstructed image the value of the item of data which is displayed. This value is compared with the instruction which is supposed to be displayed so that an inconsistency is the sign of a change in the operation of the displaying chain. It should be noted that it is the useful zone for the user, or more precisely the signal controlling the display of this zone, to which the analysis relates, so that the verification is very reliable. Only malfunctions which may occur inside the video screen are not detected by the invention. However, it should also be noted that the malfunctions which occur inside the video screen are the ones which can most generally be detected visually by the user so that the level of verification provided by the invention can be considered to be very satisfactory.

According to specific embodiments, the device may comprise one or more of the following features, taken in isolation or according to any technically possible combination:

- the device further comprises an alarm means which is capable of activating a signal or a malfunction alarm in accordance with the result at the output of the comparison means,
- the alarm means is capable of controlling a switch which is arranged on an electrical power supply line of the display device, the display device comprises a TFT screen, the video signal is a digital signal, preferably of the LVDS type, the means for analyzing the reconstructed image comprises shape recognition means, the reconstruction means is capable of reconstructing a portion of the displayed image, and more specifically only the zone in which the piece of data appears which it is desirable to verify. This useful zone generally corresponds to only a fraction of the displayed image, which may include other elements which do not require verification. Depending on the configuration of the display device, however, the useful zone may occupy all of the displayed image, the device comprises an input/output interface which is capable of receiving a signal corresponding to a reference value of the item of data to be displayed, the input/output interface is capable of allowing connection to a local network which preferably supports the Ethernet protocol, the reconstruction means is capable of processing the video signal in a manner which is substantially the reverse of the encoding carried out by a control means with which the video controller is provided in order to control the display device.

The invention also provides a method for verifying the integrity of an item of data to be displayed in an image on a display device controlled by a video controller, the video controller being connected to the display device by means of an appropriate connection and transmitting to it a video signal in a predetermined format, characterized in that it comprises the steps involving: capturing the video signal transmitted along the connection which connects the video controller to the display device; reconstructing from the video signal a reconstructed image which corresponds completely or partially to the image displayed by the display device; and analyzing the reconstructed image in order to extract a reconstructed item of data therefrom.

Preferably, the method further comprises the steps involving: comparing the reconstructed item of data with a reference of the item of data to be displayed; and activating an appropriate alarm in accordance with the result of the comparison step.

BRIEF DESCRIPTION OF THE FIGURES

Other features and advantages of the invention will be appreciated more clearly from the following detailed description, given by way of non-limiting example with reference to the appended drawings, in which.

DETAILED DESCRIPTION

Figure 1:
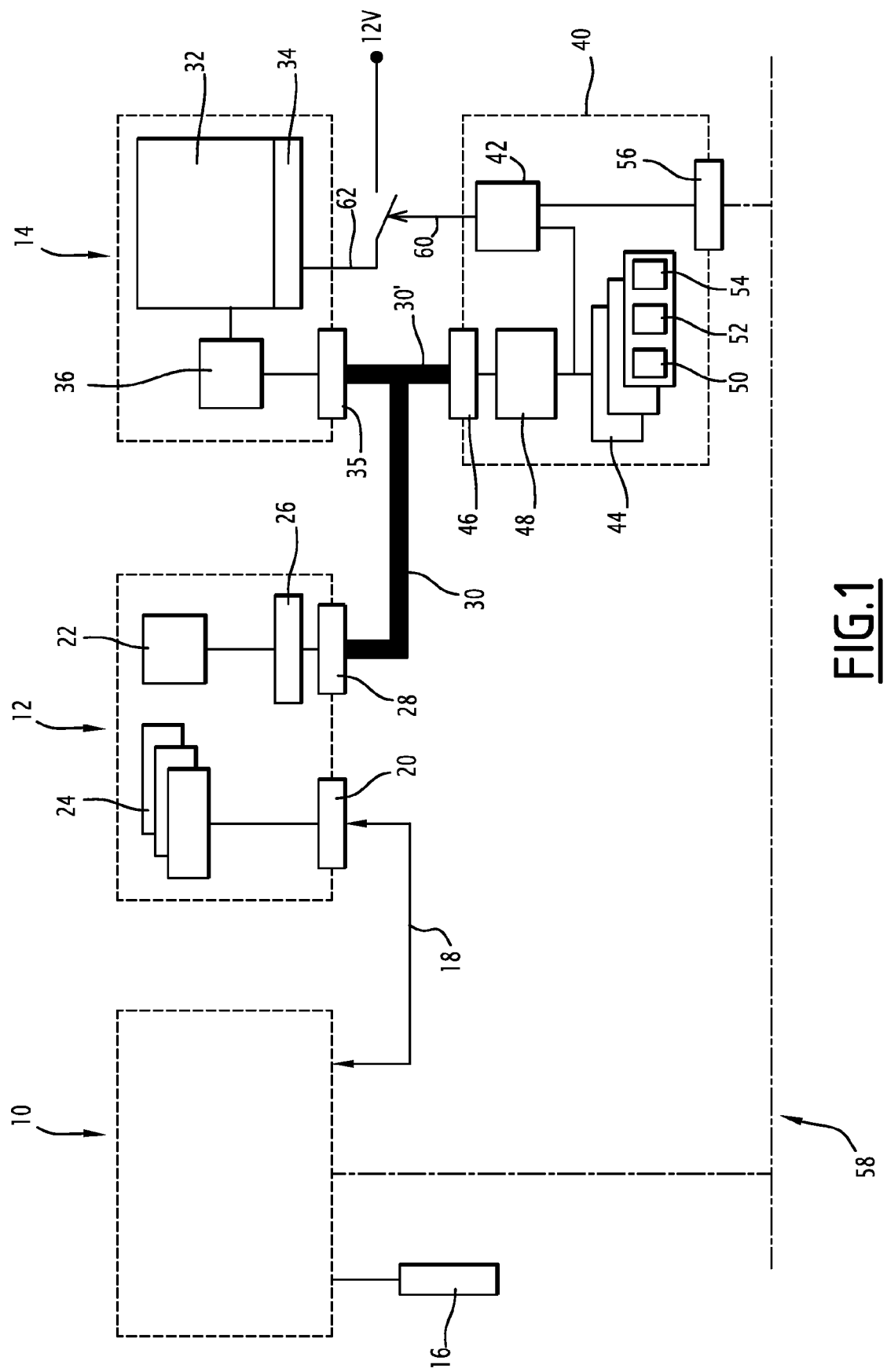
FIG. 1 is a block diagram of an architecture for displaying data, comprising a device for verifying the integrity of the display in accordance with the invention.

The architecture for displaying an item of sensitive data, such as the speed of a rail vehicle, comprises a display means and means for verifying the integrity of the display.

In a manner known per se, the display means comprises a main controller 10, a video controller 12 and a display device 14. Main controller 10 may be a processor.

The main controller 10 is connected to a sensor 16 which allows data to be captured corresponding to the instantaneous value of the speed. This connection may be direct or indirect, that is to say, the speed information may be transmitted via a connection with one or more other computers which are connected in a network, for example.

The main controller 10 comprises means which are capable, from the instantaneous value of the speed, of producing, at each sampling period of the architecture, a series of graphic orders representative of this value in order to display it in the form of an image on a screen. These graphic orders may be more or less complex: they may, for example, comprise references to elementary objects, such as lines, triangles, circles, etc., associated respectively with a list of attributes such as the position of the summits, the colors, etc. It is possible to mention by way of example three types of display for an item of quantitative information. In this manner, the value may be represented by a set of figures which forms a number representing this value. The value may also be represented by a line including the needle of a dial, whose angle formed with a reference direction is connected to the value to be displayed. The same value can be represented by a cursor which moves in a rectilinear zone and whose position inside this zone is representative of the value. In a variant, this zone may comprise two variable regions, of different colors, and the border between these two regions moves in accordance with the value to be displayed.

At the output, the main controller 10 transmits a signal which corresponds to this series of graphic orders which represent the instantaneous speed on a dedicated bus 18 which connects the main controller 10 and the video controller 12.

The video controller 12 comprises an input/output interface 20 which allows the video controller to be connected to the bus 18, a microprocessor 22, a video memory 24, means 26 for controlling the display device 14 and an output interface 28 which allows the connection between the video controller 12 and the display device 14 via a dedicated connection 30.

The series of graphic orders, received at the input of the video controller 12 is processed by the microprocessor 22 in order to generate a bit-map which represents point by point the image to be displayed. For example, the microprocessor interprets the graphic order which designates the elementary object "line" and creates the bit-map so that the corresponding image effectively comprises a line.

The bit map constructed is stored in the memory 24 of the video controller.

In order to display the bit-map as a displayed image, the processor 22 extracts the bit-map from the memory 24 and addresses it to the control means 26.

These control means 26 process the data of the bit-map in order to generate a video signal. This video signal is transmitted at the output of the controller 12 via the connection 30 towards the display device 14. Preferably, the video signal complies with the LVDS protocol (Low Voltage Differential Signaling).

The display device 14 comprises a screen 32 which is composed of pixels without remanence. Preferably, the screen 32 is a liquid crystal screen in accordance with TFT technology ("Thin Film Transistor"). In this instance, it is provided with a backlighting system 34.

Furthermore, the display device 14 comprises an input interface 35 which allows the display device 14 to be connected to the video controller 12 via the connection 30. The display device 14 also comprises control means 36 which allow the modification of the state of the transistors which are associated with each of the pixels of the screen, in accordance with the video signal received.

The chain for verifying the integrity of the display comprises a dedicated device 40.

The device for verifying the integrity of the display 40 comprises a microprocessor 42 and a memory 44.

The device 40 comprises a network input/output interface 56 which allows the device 40 to be connected to a local network 58 which complies, for example, with the ETHERNET protocol.

The verification device 40 comprises an input interface 46. The connection 30 comprises a branch 30', produced in the vicinity of the display device 14 and connected to the input 46 of the device 40. This assembly allows the video signal applied at the input of the display device 14 to be taken without disruption in order it to be also applied at the input of the verification device 40.

The verification device 40 comprises a reconstruction means or device 48 which allows, from the video signal applied at the input 46, an image to be reconstructed corresponding to the fraction of the displayed image which includes the data to be monitored. In the embodiment which is currently preferred, the reconstruction means 48 is implemented in the form of an electronic circuit. It may, for example, be a programmable component, of the FPGA type or the like. The reconstruction means 48 is capable of producing a reconstructed bit-map from the video signal in LVDS format. The reconstruction means 48 carries out a processing substantially the reverse of the encoding carried out by the control means or device 26 of the video controller. The term "substantially the reverse" is intended to refer to the fact that the reconstruction analyses the frames of the LVDS signal using the predefined syntax thereof in order to identify the co-ordinates of the points of the bit-map analyzed so as to retain only the relevant points in the reconstructed bit-map and therefore to limit the size thereof in order to retain only the zone in which the information to be verified is located.

The format of the reconstructed bit-map may be different from the format of the bit-map contained in the memory 24 of the video controller.

The verification device 40 further comprises an image analysis means or device 50, a comparison means or device 52 and an alarm means or device 54. In the embodiment which is currently preferred, the analysis means 50, comparison means 52 and alarm means 54 are implemented, respectively, by carrying out data-processing programs whose instructions are stored in the memory 44 of the verification device 40.

The image analysis means 50 allows a reconstructed item of data to be extracted from the bit-map reconstructed by the reconstruction means 48.

Amongst other information, the main controller 10 transmits to the verification device 40 a reference value for the instantaneous speed. This reference value may be the value of the instantaneous speed from which the image displayed has been produced, that is to say, the value measured by the sensor 16. Preferably, the reference value is the value of the instantaneous speed measured using other speed acquisition means, in order to provide not only verification of the integrity of the display of the data, but also the acquisition of this data. In this instance, the reference value is transmitted on the local network 58 which complies, for example, with the ETHERNET protocol, by a processor other than the main controller 10. That is to say, the verification is advantageously carried out by comparing the data which has been reconstructed not with the reference which has been used to produce the display but instead with a similar reference which is from a parallel source which is independent of the main controller 10 and in particular the video controller.

The comparison means 52 of the device 40 compares the reconstructed data with the reference value of this data.

The alarm means 54 generates an alarm in accordance with the result obtained at the output of the comparison means 52.

The device 40 comprises a controlled switch 60 which is arranged in series on a supply line 62 of the backlighting system 34 of the screen 32. The alarm means 54 is capable of controlling the opening of the switch 60 in the event of a discrepancy between the reconstructed data and the reference value. Since the backlighting system 34 of the screen is in a powerless state, the data displayed are illegible for the driver since the display device appears completely black. Even a partial malfunction of the screen can be immediately identified visually by the user, who will make the necessary arrangements to overcome this malfunction.

The method for verifying the integrity of the display used by the verification device 40 will now be described with reference to FIG. 2.

In this Figure, a sensitive item of data Data is intended to be displayed in the cabin, in real time. This is, for example, the instantaneous speed of the rail vehicle. This data is measured by a first acquisition chain. The value measured at a given time by this first chain is designated Data1.

Figure 2:
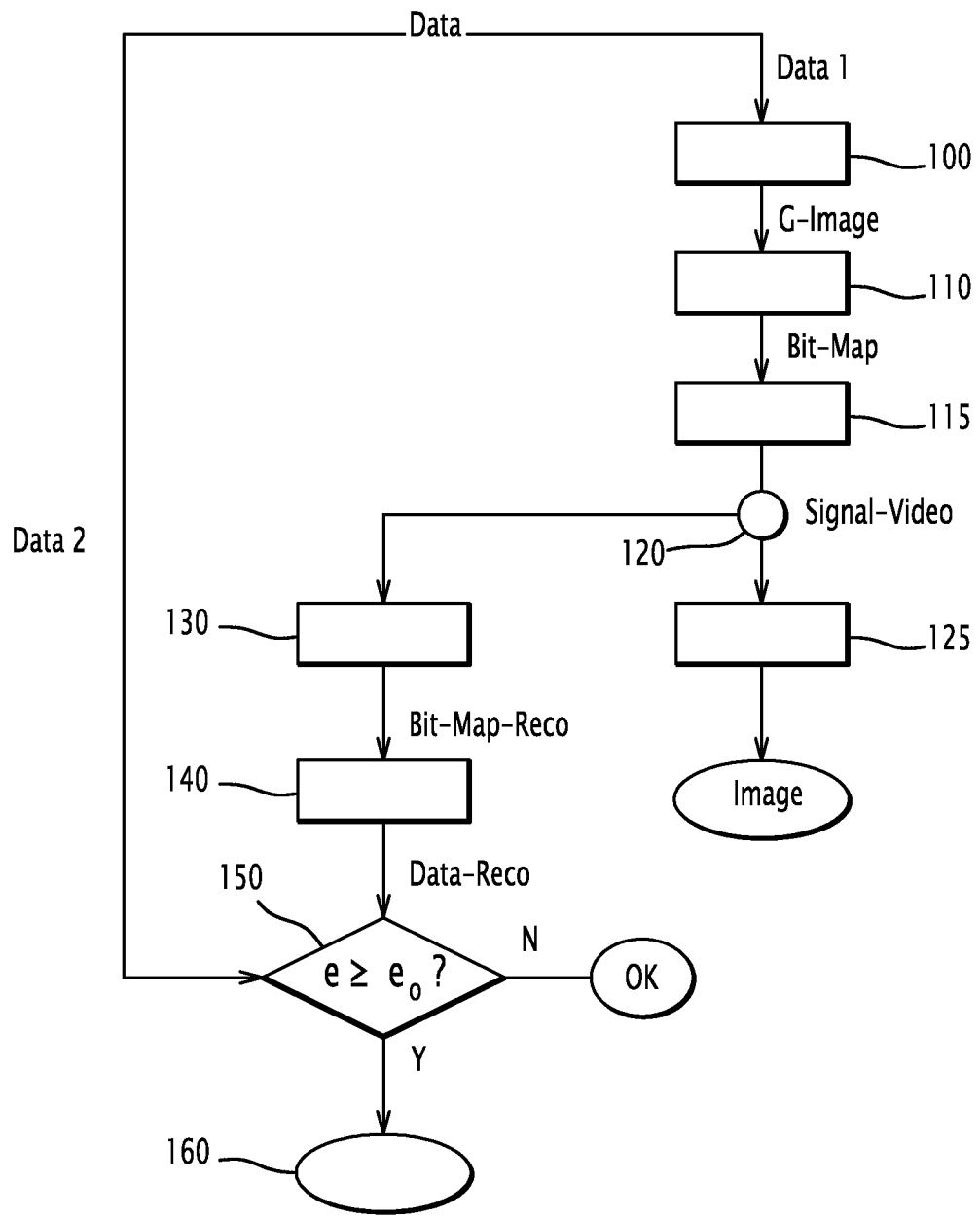
FIG. 2 is an algorithm which represents the different steps of the method for verifying the integrity of the display, implemented by the architecture of FIG. 1.

The display means is illustrated at the right-hand portion of FIG. 2. It allows the measured value Data1 to be displayed inside a displayed image Image on the screen of the display device 14 (FIG. 1).

To this end, at step 100, a series of graphic orders G-Image is generated by the main controller 10, from the measured value Data 1.

The series of graphic orders G-Image is transmitted to the video controller 12.

At step 110, the video controller 12 processes the series of graphic orders G-Image in order to generate a bit-map Bit-Map which it stores in the memory means 24 thereof.

Using the appropriate control means 26, the video controller 12 generates (step 115) an LVDS video signal Signal-Video from the bit-map Bit-Map. It transmits this signal along the connection 30 in the direction of the display device 14.

Finally, at step 125, the display device 14 displays the image on the screen 32 in accordance with the signal Signal-Video received.

In the left-hand portion of FIG. 1, the chain for verification of the integrity of the display first involves acquiring the video signal Signal-Video by taking it by branching the connection 30 between the video controller 12 and the display device 14 (step 120).

The first step 130 involves, using the reconstruction means 46, reconstructing, from the video signal Signal-Video taken, a reconstructed bit-map Bit-Map-Reco which is stored in the memory 44 of the device 40. It should be noted that this reconstruction may take place only on a portion of the displayed image. In this manner, an appropriate parametering allows only the data which correspond to the zone in which the information to be verified is located to be taken from the video signal Signal-Video in order to facilitate the processing operation. This parametering may be adapted or programmed in accordance with the ergonomics of the display. The reconstructed bit-map Bit-Map-Reco is stored for a sufficient length of time to allow the recognition processing operation described below.

Then, at step 140, by carrying out the analysis means 50 which implements, for example, shape recognition programs, the reconstructed bit-map Bit-Map-Reco is analyzed in order to extract therefrom a reconstructed item of data Data-Reco which corresponds to the data contained in the displayed image Image.

More precisely, this extraction can be carried out in accordance with an algorithm which is dependent on the manner in which the information is displayed. In this manner, when the information is displayed in the form of a set of alphanumeric characters, and in particular figures, the extraction is carried out using a character recognition method and, for example, by means of a series of matrix comparisons with reference images of memorized characters. This is even easier since the positions of the different characters can be predefined. When the information is in the form of a "bar-graph", that is to say, a substantially rectangular elongate zone which has two regions of different colors, the extraction involves detecting in this zone the color change line in order to measure the position thereof relative to the inside of the zone. If the information is displayed by a figure which is similar to a dial with a needle, the extraction may involve detecting the intersection of the line including the needle with an arc of a circle centered on the pivoting point of the needle. A more reliable result can be obtained by multiplying the concentric circular arcs and combining the intersections detected.

Following the analysis step, the comparison step 150 allows a discrepancy e to be compared relative to a threshold discrepancy $e_0$. The discrepancy e is obtained by the difference between the reconstructed data Data-Reco and a reference value Data2 at the time in question. As indicated above, the reference value preferably originates from a second acquisition chain which allows the instantaneous value Data2 to be measured for the data Data in a manner which is completely independent of the first acquisition chain.

When the instantaneous discrepancy e remains lower than the threshold discrepancy $e_0$, this means that no malfunction exists along the information display path.

However, when the instantaneous discrepancy e is greater than the threshold discrepancy $e_0$, an alarm is activated (step 160).

In the embodiment currently envisaged, this alarm involves activating the controlled switch 60 so that it pivots from the closed position to the open position so as to place the backlighting system 34 of the screen 32 in a powerless state.

Other algorithms more complex than a simple comparison of a discrepancy with a threshold may be envisaged to decide the activation of an alarm.

In a variant, the device and the method which have been described above are suitable for processing a video signal which complies with digital protocols other than the LVDS protocol. It is also envisaged that the video signal may be analogue and not digital.

In a variant, the reconstruction means reconstructs only a portion of the displayed image, corresponding to the significant portion of this image.

The device for verification of the integrity of the display prevents the content of the memory of the video controller from being read. It allows the integrity of the display to be verified downstream of the video controller, as far as the immediate region of the display device.

Since the display device comprises pixels with no remanence, if a malfunction affects the display device as such, the erroneous image displayed at a specific time will no longer be displayed at the following time. There is consequently no fear of a malfunction of the type leading to freezing of the displayed image.

Consequently, the device according to the invention, by verifying the video signal applied at the input of the display device, allows verification of the integrity of the display over the whole of the displaying chain.

The device according to the invention thus may significantly increase the security level of the display.

Furthermore, in the architecture proposed, each means belongs either to the display path or to the verification path. There are no means common to these two paths, in contrast to the prior art in which the video memory was read both by the processor of the video controller and by the processor used for the verification. Consequently, the homologation of the architecture proposed, and more specifically the verification device, is more simple to achieve.

Advantageously, the verification device which has been set out above is integrated in the display device, the branching of the video signal taking place immediately downstream of an input interface which is common to the display and verification devices.

Other variants may be envisaged, such as moving the comparison and alarm functions away from the functions for reconstructing the image.

The invention claimed is:

1. A verification device for verifying the integrity of a display means, the display means comprising an acquisition device, a main processor, a video controller and a display device controlled by a video controller, the video controller being connected to the display device by a dedicated connection, the acquisition device measuring an instantaneous value of a data, the main processor producing, from the instantaneous value, a series of graphic orders representative of the instantaneous value, the video controller including a microprocessor and a control means, the microprocessor receiving the series of graphic orders from the main processor and generating a bit-map, the control means processing the bit-map in order to generate a video signal in a predetermined format, the video signal being transmitted at the output of the controller, via the connection, towards the display device, the instantaneous value being displayed in a zone of an image displayed on the display device, the verification device including an input interface which allows the verification device to be connected at a branch of the connection between the video controller and the display device; the verification device comprising:
   a reconstruction device reconstructing a reconstructed image from the video signal applied to the input interface corresponding to the zone of the image displayed on the display device;
   an image analyzer extracting a reconstructed value of the data from the reconstructed image; and
   a comparison device comparing the reconstructed value of the data with a reference value of the item of data to be displayed, the reference value being the instantaneous value of the data measured using the acquisition device or the instantaneous value of the data measured using another acquisition device,
   wherein the reconstruction device processes the video signal in a manner which is the reverse of the encoding carried out by the control means with which the video controller is provided in order to control the display device.

2. The device according to claim 1, further comprising an alarm that activates a signal or a malfunction alarm in accordance with a result at an output of the comparison device.

3. The device according to claim 2, wherein the alarm controls a switch arranged on an electrical power supply line of the display device.

4. The device according to claim 1, wherein the display device includes a TFT screen.

5. The device according to claim 1, wherein the video signal is a digital signal.

6. The device according to claim 5, wherein the digital signal is of the LVDS type.

7. The device according to claim 1, wherein the analyzer includes a shape recognition device.

8. The device according to claim 1, wherein the zone covers only a portion of the displayed image.

9. The device according to claim 1, further comprising an input/output interface receiving a signal corresponding to the reference value of the item of data to be displayed.

10. The device according to claim 9, wherein the input/output interface allows connection to a local network.

11. The device according to claim 10, wherein the local network supports the Ethernet protocol.

12. A method for verifying the integrity of a display means, the display means comprising an acquisition device, a main processor, a video controller and a display device controlled by a video controller, the video controller being connected to the display device by a dedicated connection, the acquisition device measuring an instantaneous value of a data, the main processor producing, from the instantaneous value, a series of graphic orders representative of the instantaneous value, the video controller including a microprocessor and a control means, the microprocessor receiving the series of graphic orders from the main processor and generating a bit-map, the control means processing the bit-map in order to generate a video signal in a predetermined format, the video signal being transmitted at the output of the controller, via the connection, towards the display device, the instantaneous value being displayed in a zone of an image displayed on the display device a video signal in a predetermined format, the video signal being transmitted at the output of the controller, via the connection, towards the display device, the instantaneous value being displayed in a zone of an image displayed on the display device, the method comprising the steps of:

- capturing the video signal transmitted along the connection which connects the video controller to the display device;
- reconstructing from the video signal a reconstructed image which corresponds to the zone of the image displayed by the display device; and
- analyzing the reconstructed image in order to extract a reconstructed value of the data therefrom, and
- comparing the reconstructed value of the data with a reference value of the item of data to be displayed, the reference value being the instantaneous value of the data measured using the acquisition device or the instantaneous value of the data measured using another acquisition device,
- wherein the reconstruction step includes processing the video signal in a manner which is reverse of the encoding carried out by the control means with which the video controller is provided in order to control the display device.

13. The method according to claim 12, further comprising activating an appropriate alarm in accordance with the result of the comparison step.

* * * * *